(12) United States Patent
Vilhauer et al.

(10) Patent No.: US 8,638,072 B2
(45) Date of Patent: Jan. 28, 2014

(54) METHOD AND APPARATUS FOR MANAGING CHARGING CURRENT

(75) Inventors: Reed D. Vilhauer, Portland, OR (US); Paul S. Durley, Portland, OR (US); Darren S. Crews, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 13/078,216

(22) Filed: Apr. 1, 2011

(65) Prior Publication Data
US 2012/0249084 A1    Oct. 4, 2012

(51) Int. Cl.
*H02J 7/04*    (2006.01)
*H02J 7/16*    (2006.01)

(52) U.S. Cl.
USPC ........................................... 320/162

(58) Field of Classification Search
USPC ........................................... 320/162
See application file for complete search history.

(56) References Cited

U.S. PATENT DOCUMENTS

| | | | |
|---|---|---|---|
| 7,847,520 B2 * | 12/2010 | Veselic et al. | 320/137 |
| 2004/0095827 A1 * | 5/2004 | Perner et al. | 365/209 |
| 2007/0182599 A1 * | 8/2007 | Bingel et al. | 341/50 |
| 2008/0204958 A1 * | 8/2008 | Shearon et al. | 361/93.9 |
| 2008/0258688 A1 | 10/2008 | Hussain et al. | |
| 2010/0070659 A1 * | 3/2010 | Ma et al. | 710/14 |
| 2010/0270981 A1 | 10/2010 | Motomiya | |

OTHER PUBLICATIONS

International Search Report and Written Opinion for PCT Patent Application No. PCT/US2011/067147, mailed Sep. 14, 2012, 11 pages.

* cited by examiner

*Primary Examiner* — Arun Williams
(74) *Attorney, Agent, or Firm* — Kacvinsky Daisak PLLC

(57) ABSTRACT

An apparatus may comprise first circuitry arranged to draw current from a charging source at multiple current levels and second circuitry arranged to determine a charging current capacity of the charging source using the first circuitry.

17 Claims, 5 Drawing Sheets

METHOD AND APPARATUS FOR MANAGING CHARGING CURRENT

BACKGROUND

With USB now serving as a common connector for portable devices, such as notebooks, tablets, PDAs, and cell phones, dedicated chargers are no longer a sole or main source for charging many portable devices. For example, auto manufacturers around the world are increasingly integrating USB into the vehicle console to serve as both a data connection and as a universal charging interface for any USB-compatible device that a driver may wish to charge while in the auto. In addition, generic wall chargers are widely available to supply charge to any device having a USB port. In some cases, the USB port may be optimized for only charging, which is known as a Dedicated Charging Port or DCP. A DCP reduces the cost of USB-based charging by implementing only those components required for charging devices.

The range of typical output currents for different charging sources may be up to about several Amperes (A). Charging time is dependent upon the charging current, so that the more current a device can draw, the faster it can charge. By supplying up to 1.5 A charging current, a DCP port can significantly reduce device charging time compared to chargers limited to 500 mA or less.

However, one issue of concern for charging a device from an unknown charging source is that the output current may be different for different charging sources, such as different USB chargers. When a device is charged by an unknown charging source, the portable device may have no information as to the amount of current that can be delivered from the charging source. Instead, the portable device may be set to blindly assume that a particular value of current can be delivered from the USB charging source. Even in cases where the portable device recognizes the type of charger, it may attempt to draw current at levels very different from that supplied by the charger. In some cases, the portable device may be capable of determining that a USB charging source is a DCP or an Accessory Charger Adapter (ACA), from which it may be assumed that the range of available current is between 500 mA to 1.5 A, in keeping with present day standards. In such cases, the portable device may either assume that a minimum or maximum amount of current can be supplied, depending on how aggressively the device is arranged to charge the battery. For example, the portable device may be set to draw large currents under the assumption that a maximum amount of current can be delivered from the charging source, and may then monitor the charging process once a large current is drawn. In some cases, without knowledge of the actual charging current capability of the charger, the portable device may begin to blindly draw 1.5 A current to charge its battery, even when the charging source can only provide 500 mA of charging current. This may lead to collapse of the charging source's voltage, requiring the circuitry in the portable device to turn off or the charger to turn down, which may potentially harm the battery or trip circuitry in the portable device or charging source.

On the other hand, if the portable device is blindly set to draw 500 mA, the charge time may be unnecessarily lengthened if the charging source is capable of providing a higher current. In addition, the power made available to the system may be unnecessarily limited by a low current setting.

It is with respect to these and other considerations that the present improvements have been needed.

DETAILED DESCRIPTION

Various embodiments may be generally directed to methods and apparatus for charging devices including mobile computing or mobile communication devices, or devices that are arranged to perform both computing and communications.

Various embodiments may comprise one or more elements. An element may comprise any structure arranged to perform certain operations. Some elements may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
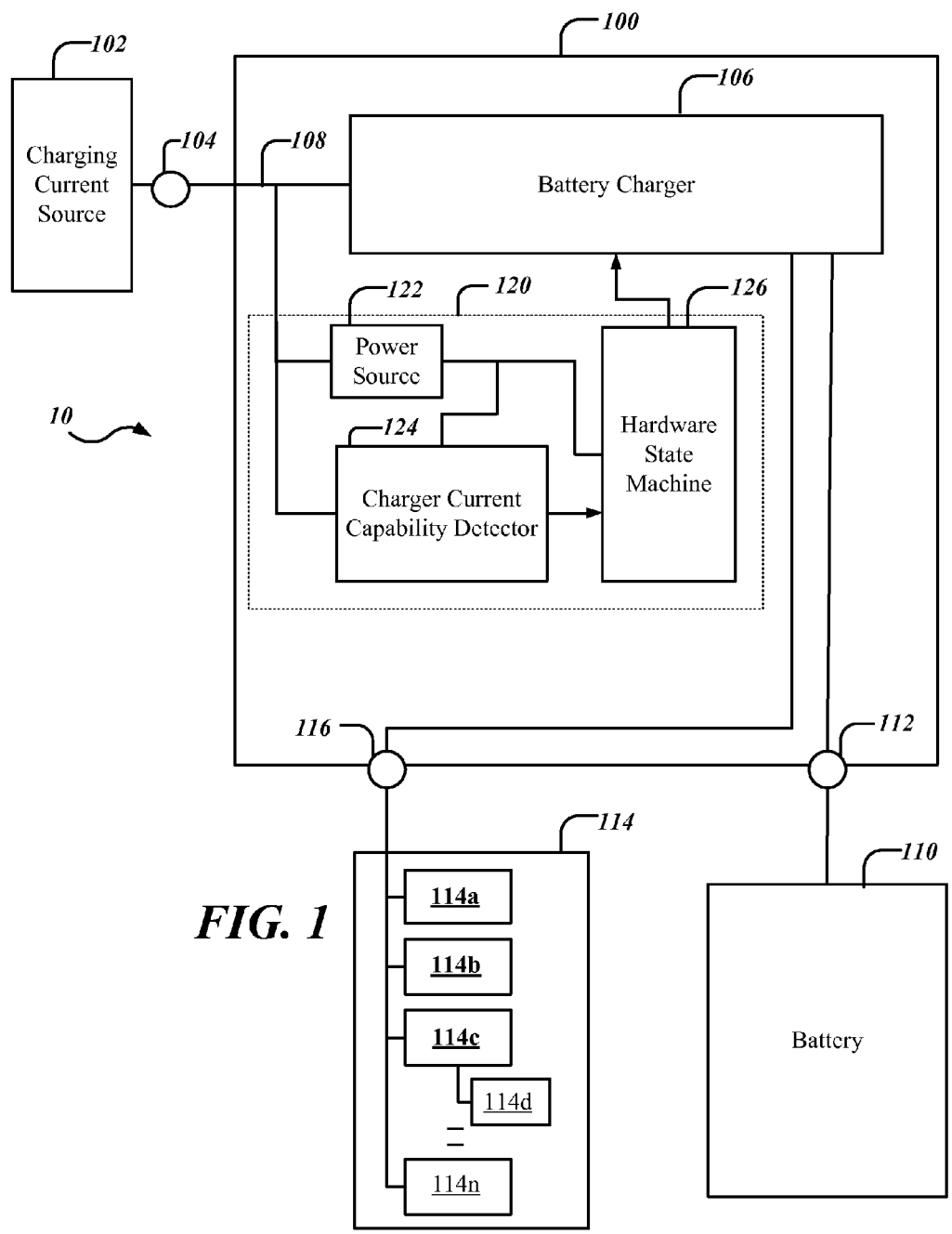
FIG. 1 depicts one embodiment of a charging arrangement.

FIG. 1 depicts one embodiment of a charging arrangement that facilitates charging for a portable system 10. The portable system 10 may include one or more integrated circuit chips for managing charging current, which is generally referred to as a charger chip. In some embodiments, the "charger chip" may be one or more dedicated integrated circuit chips that are directed to charging functions. In some embodiments, the "charger chip" may comprise a power management integrated circuit (PMIC) that includes other devices and functions. In the discussion to follow and in the figures, merely for the purposes of illustration, a chip containing current charger functions is generally referred to as a PMIC. However, such designation is meant to cover dedicated charger chips that may not necessarily include additional function or devices.

As depicted in FIG. 1, the PMIC 100 may be coupled to a charging current source (also termed "charging source") 102 through a port 104. The charging current source may be any of known chargers, such as USB chargers, including DCP-type chargers. It is to be noted that the charging current source may typically be a power source having a regulated voltage and limited current sourcing capabilities.

In various embodiments, charging port 104 may be a USB port and may be compatible with an Accessory Charger Adapter (ACA) or a DCP charger. PMIC 100 may also include a battery charger 106 that is coupled to a power input line 108 to receive charging current from charging current source 102.

Battery charger 106 may distribute power to various components of system 10. When charging power is available and the battery 110 is not fully charged, battery charger 106 may provide power to battery 110 through node 112. Battery charger 106 may also be arranged to provide power to platform components 114a-n through node 116.

PMIC 100 may also include a charger current estimation device (also simply referred to hereinafter as "device") 120. The charger current estimation device may be arranged to determine the charging current capacity of an external charging current source when the external charging current source is coupled to system 10. The term "charging current capacity," as used herein, refers to the output current that the charging current source is capable of delivering. Device 120 may include several components that are interoperable to determine in real time the charging current capacity of an external charging device and to provide a signal to PMIC 100 to adjust the charging current drawn from the external charging device. In various embodiments, once the presence of a charging source is detected by PMIC 100, device 120 may rapidly determine the charging current capability (capacity) of the charging source that provides the charging current, thereby allowing PMIC 100 to adjust the level of charge current supplied to system 10 components, such as battery 110. In this manner, voltage droop from the charging source may be prevented, thereby avoiding potential harm to the battery or other negative impacts on circuitry in system 10.

Device 120 may include a power source 122, a charging current capability (capacity) detector (or, "current capacity detector," or simply "detector") 124, and hardware state machine 126. The power source 122 may be a voltage regulator such as a low-dropout (LDO) regulator of known design. Power source 122 may be arranged to supply power to both detector 124 and hardware state machine 126. In operation, power source 122 may receive an input voltage from the external charging source 104 and may output power at a controlled voltage to operate components of detector 124 and hardware state machine 126.

Detector 124 may also be coupled to the current signal sent from charging current source 102 through input line 108, which may comprise several different paths, as illustrated in FIG. 1. In various embodiments, detector 124 may be arranged to probe the charging current capability of charging current source 102 (also termed "current source") by monitoring the voltage on line 108 when charging current passes through detector 124. As detailed below, in some embodiments, detector 124 may be arranged to sink various amounts of current received from current charging source 102. By sinking different amounts of current, detector 104 may accurately and rapidly assess the charging current capacity of current source 102, which may be unknown a priori to system 10. When the amount of current sunk by detector 124 exceeds the charging current capacity of current source 102, the voltage on line 108 may droop. Accordingly, by monitoring the line 108 voltage, detector 124 may determine the current level where the charging current source capacity is exceeded.

In various embodiments, hardware state machine 126 may be arranged to control the probing of current source 102 by detector 124. In some embodiments, as detailed below, hardware state machine 126 may execute a search algorithm, such as a binary-search algorithm, which may control the sinking of current in detector 124, assess the results of the current sinking, and store a charging current capacity value based upon the results of the execution of the binary-search algorithm by detector 124.

Once the value of charging current capacity is determined for a given charging current source, the current supplied to battery 110 by battery charger 106 may be adjusted. In some embodiments, hardware state machine 126 may be arranged to send a signal to battery charger 106 to adjust current, which may be accomplished in some embodiments by adjusting an input-current-limiting transistor (not shown) within battery charger 106. While the charging current source 102 is coupled to port 104, the battery charger 106 then may continue to provide current to battery 110 during a charging mode at a level that may approximate the current capacity of source 102. In this manner, the battery 110 may be charged at an optimum charge rate without risking harmful effects from attempting to draw current at levels higher than the charging current capacity of current source 102.

Figure 2:
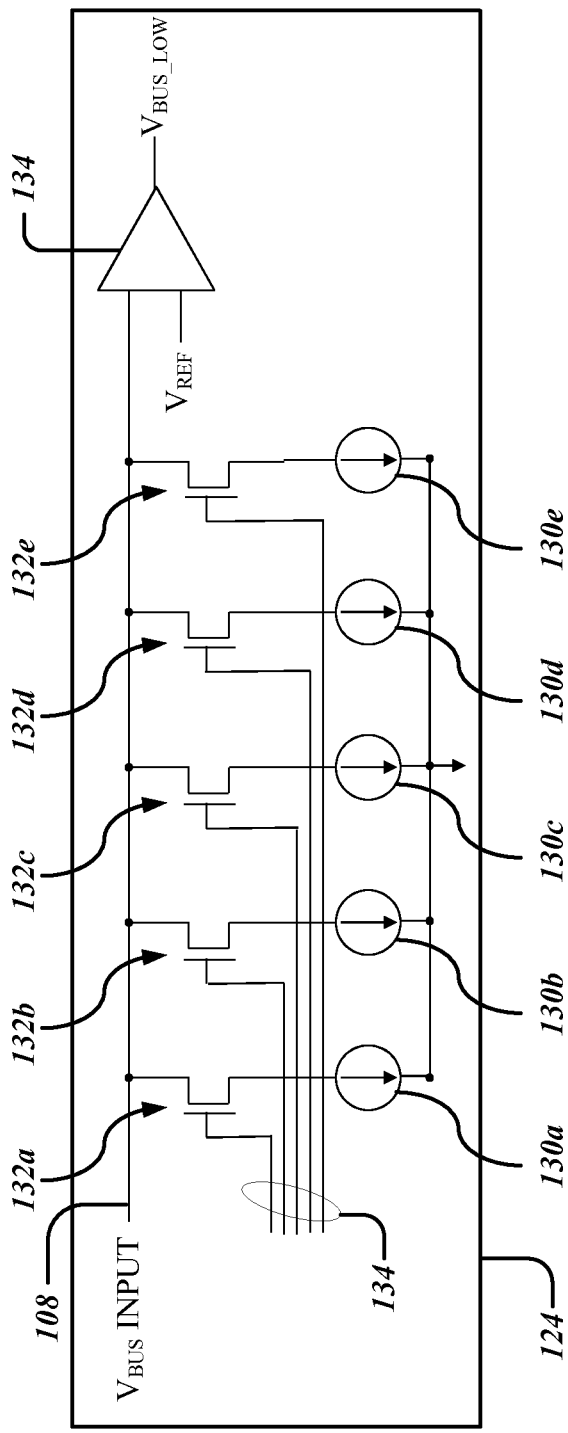
FIG. 2 depicts one embodiment of a detector for detecting charging current capacity.

FIG. 2 depicts one embodiment of detector 124 in which a series of current sources 132 are operable to sink current supplied over line 108. Current sources 132 may also be referred to as "current sinks" since they may function to sink the current supplied by the charging source. In various embodiments, detector 124 may be arranged to probe the current charging capability of a USB-based charger, including a DCP charger that may supply charging current through a dedicated port. For purposes of illustration, the examples to follow may focus on USB DCP charger systems in which charging sources generally operate between 500 mA and 1500 mA. However, other embodiments in which the USB charger is a non-standard charger are also possible, wherein higher currents are possible depending on configuration.

As illustrated, a current signal may be supplied to detector 124 from a USB charger as $V_{BUS}$ INPUT. The $V_{BUS}$ voltage may be monitored by a comparator 134, which has an input coupled to line 108 to receive the $V_{BUS}$ INPUT signal. Voltage comparator 134 has an additional input supplied by a reference voltage $V_{REF}$, which, in some embodiments, may be a value ranging from 2.0 V to 4.5 V. Comparator 134 may be arranged to output a signal based on the inputs from $V_{BUS}$ INPUT and $V_{REF}$. In particular, comparator 134 may output a $V_{BUS\_LOW}$ signal when the comparator detects that the $V_{BUS}$ voltage is lower than $V_{REF}$. Referring also to FIG. 1, the output from comparator 134 may be monitored by hardware state machine 124, which may then perform an appropriate operation based upon the output of comparator 134.

In various embodiments, current weight of each of current sink 130 may be arranged according to the desired charging current capacity range to be probed. Current sinks 130 may have the same or different current weights according to some embodiments. In some embodiments more than one current sink may have the same current weight, while one or more other current sinks have a different current weight. In different embodiments, the combination of current weights and the number of current sinks may be chosen according to the desired accuracy for determining the charging current capacity of the charging source. In various embodiments, the current sinks 130 may be designed with current weights appropriate for a USB charging source, such as a DCP charger. In one embodiment, detector 124 may include five current sinks 130a-e as illustrated.

The current sinks may be arranged to sink different amounts of current that conveniently span a range of likely current values to be supplied by the DCP charger. In some embodiments, in accordance with standards that specify charging current to be between 500 mA and 1500 mA for DCP chargers, the current sinks may be arranged to sink currents up to at least about 1500 mA. In one example, sinks 130a-e may be arranged to sink respective currents of 800 mA, 400 mA, 200 mA, 100 mA, and 50 mA.

In operation, when PMIC 100 detects a $V_{BUS}$ INPUT signal, one or more of current sinks 130a-e, which may be arranged in parallel, may be enabled (electrically coupled to the $V_{BUS}$ INPUT signal) according to a sequence determined by hardware state machine 126. For example, a control signal may be sent to one or more gates 130 of transistors 132a-e using control lines 134. The control signals may thereby open one or more transistor gates that control one or more respective current sinks 130a-e, thereby coupling the one or more current sinks to the charging current present on input line 108. If the DCP charging source has a capacity of 1000 mA, once sufficient current sinks 130 are enabled to sink current in excess of 1000 mA, the $V_{BUS}$ INPUT signal voltage detected by comparator 134 may droop enough to cause an output of the $V_{BUS\_LOW}$ signal. This indicates to the PMIC that the charging current value corresponding to the total current sunk by the enabled current sinks (also termed "sinking current") is greater than the charging current capacity of the USB charging source. This may trigger further actions by estimation device 120, which may include sending signals to detector 124 to decrease the total sinking current or to stop the detection process and record the present value of sinking current, among other actions.

In various embodiments, PMIC 100 may determine the charging current capacity of a USB charger by performing a search process in which current sinks 130 are enabled/disabled according to an algorithm embodied in hardware state machine 126. The hardware state machine may be arranged to perform a fixed search process or may be programmable.

Figure 3:
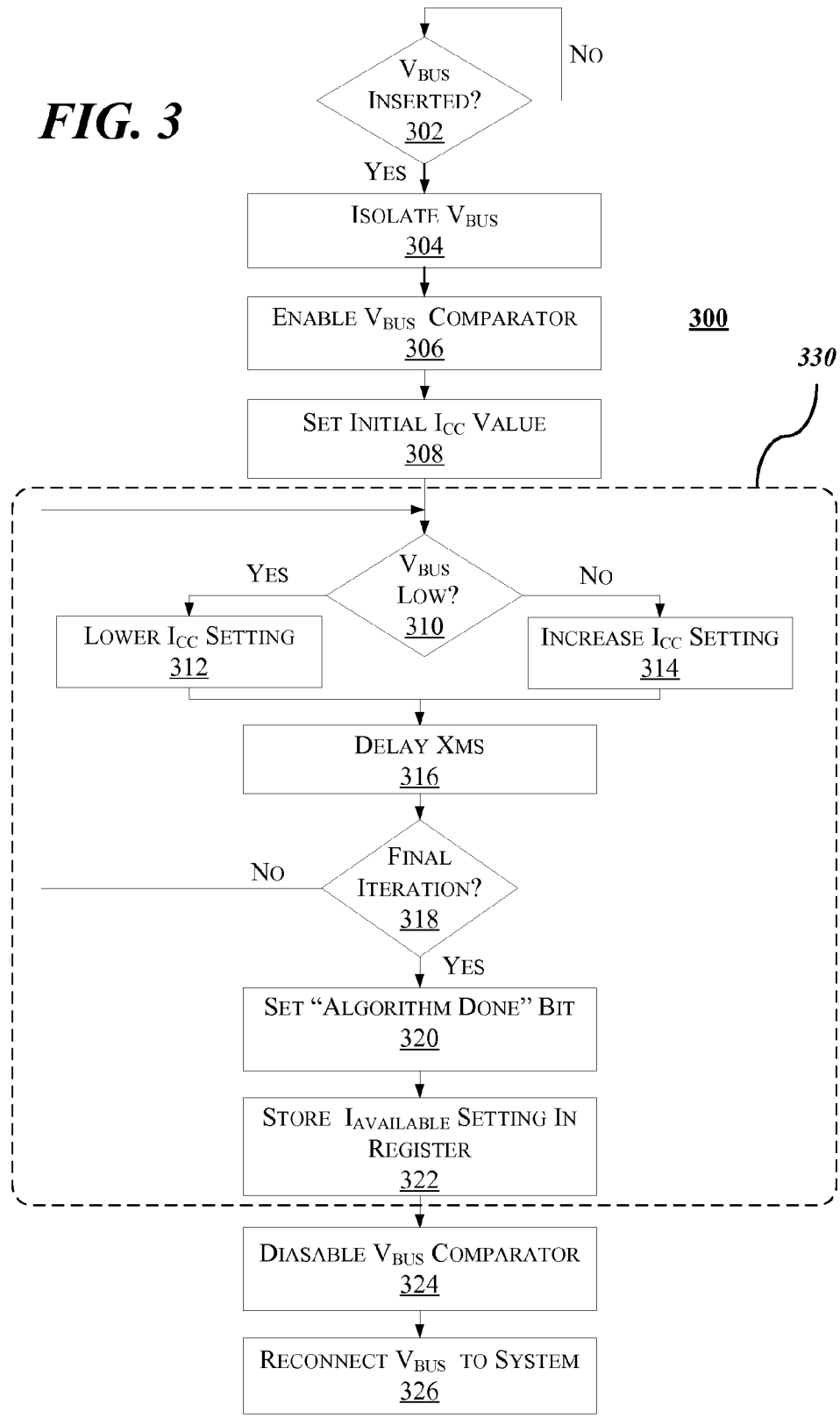
FIG. 3 depicts one embodiment of a process that may be performed by a power management device.

FIG. 3 depicts one embodiment of a process 300 that may be performed by a device, such as a PMIC. In various embodiments, the process 300 may be used to set the output current level of a battery charger that is coupled to a charging current source of unknown charging current capability. In some embodiments, the blocks 310-322 may be executed by a hardware state machine.

At block 302, if the insertion of a $V_{BUS}$ signal (indicating the charging source current) is detected, then the process moves to block 304. If no insertion is detected, then no further action is taken until the insertion is detected.

At block 304, the $V_{BUS}$ signal is isolated. In this manner, the $V_{BUS}$ signal may be restricted to within components of the PMIC, such as the charging current capability detector and a power source used to operate the detector and hardware state machine. Thus, a battery, such as battery 110 is isolated from receiving charge from a charging source applying the $V_{BUS}$ signal.

At block 306, a $V_{BUS}$ comparator is enabled. Once the $V_{BUS}$ comparator is enabled, the charging current capability detector may monitor the voltage on a line carrying the $V_{BUS}$ signal supplied to the detector, as described above.

At block 308, an initial value of charging current is set. This initial value may correspond to any convenient value of charging current ($I_{CC}$) to be sunk by enabled current sinks, as detailed previously. The level of the initial current value may be set to optimize a search process to determine the charging current level to be set in the battery charger of a PMIC. In some embodiments, the initial current value may be fixed in hardware, such that the same initial value is stored in a hardware state machine. Thus, using the example of a USB DCP charger, because the PMIC may recognize that the charging current capability of an attached device is in the range of 500 mA to 1500 mA, the initial current value may be set within that range. In this manner, convergence to the correct charging current level may be faster than if the initial value were set outside of the expected range.

At block 310, it is determined whether a $V_{BUS\_LOW}$ signal has been received. If a $V_{BUS\_LOW}$ signal is detected, this indicates that the amount of sinking current is sufficient to produce a voltage droop on a $V_{BUS}$ INPUT line, thereby signaling that the charging current capacity of the charger may have been exceeded. This determination triggers the process to move to block 312.

At block 312, the charging current ($I_{CC}$) setting is lowered. In various embodiments, the lowering of charging current level causes a disabling of one or more previously enabled current sinks. In some embodiments, the disabling is accomplished by sending control signals to close a transistor gate that is coupled to the current sink to be disabled and coupled to the $V_{BUS}$ INPUT line, as previously discussed.

If $V_{BUS\_LOW}$ signal is not detected at block 310, this indicates that the amount of sinking current is insufficient to produce a voltage droop on a $V_{BUS}$ INPUT line, thereby signaling that the charging current capacity of the charger may not have been exceeded. The process then moves to block 314.

At block 314, the charging current setting is increased. In various embodiments, the increasing of charging current level causes an enabling of one or more previously disabled current sinks. In some embodiments, the enabling is accomplished by sending control signals to open a transistor gate that is coupled to a current sink to be enabled and to the $V_{BUS}$ INPUT line.

After either an increase (314) or decrease (312) in $I_{CC}$ is performed, the process moves to a delay block (316), and thence to block 318. The delay time may be arranged to provide sufficient time for the charging source to recover after being overloaded.

At block 318, a determination is made as to whether the previous adjustment (either block 312 or 314) is a final iteration in adjustments to be made to the $I_{CC}$ value. If the previous adjustment in $I_{CC}$ value is not the final iteration, the process returns to block 310, after which further adjustments to the $I_{CC}$ value are made.

To further clarify operation of the binary searching process outlined in blocks 310-318 it may be useful to consider the aforementioned embodiment of a charger current capability detector depicted at FIG. 2. In embodiments in which a USB DCP charger is coupled to a PMIC, the anticipated charging current capacity may range between 500 mA and 1500 mA in accordance with the present day standard. With the aid of a set of five current sinks having values of 800 mA, 400 mA, 200 mA, 100 mA, and 50 mA, this entire range of 500 mA-1500 mA charging current may be probed.

In one example, the actual value of charging current supplied by the charger may be 1460 mA and the initial $I_{CC}$ setting by a PMIC may be 800 mA. This initial value may be established by enabling the 800 mA sink of a detector. In an initial sequence, at block 310, the process 300 accordingly determines that no $V_{BUS\_LOW}$ signal has been detected, since the 1460 mA current source would not be subject to a voltage droop on an input line coupled to an 800 mA current sink.

The process then moves to block 314 in which an additional current sink may be enabled to increase the $I_{CC}$ setting, which corresponds to the total sinking current from all enabled current sinks. In one example, a 400 mA sink may be added at block 314, leading to a total $I_{CC}$ setting of 1200 mA. At block 318, the system may determine that the previous instance of increasing the $I_{CC}$ setting by 400 mA is not the final iteration.

In a subsequent iteration, at block 310, the process 300 once again determines that no $V_{BUS\_LOW}$ signal has been detected, since the 1460 mA current source would not be subject to a voltage droop on an input line coupled to current sinks totaling 1200 mA sinking current. At block 314, the $I_{CC}$ setting may once again be increased, this time by enabling an additional current sink, which may be a 200 mA current sink, thereby establishing a total sinking current of 1400 mA. After this iteration, the total sinking current is slightly less than the actual charging current capacity of the 1460 mA charger.

If the process continues for another iteration, at block 310, the process 300 again determines that no $V_{BUS\_LOW}$ signal has been detected, since the 1460 mA current source may not be subject to a voltage droop when the input line is now coupled to current sinks totaling 1400 mA sinking current. In this circumstance, the process moves to block 314, where the $I_{CC}$ setting may be further increased, this time by enabling a 100 mA current sink, which establishes a total sinking current of 1500 mA. After this iteration, the total sinking current is slightly in excess of the actual charging current capacity of the 1480 mA charger.

In a further iteration, at block 310, the process 300 determines that a $V_{BUS\_LOW}$ signal has been detected, since the 1460 mA current source may be subject to a voltage droop when the input line is coupled to current sinks totaling 1500 mA sinking current. In this circumstance, the process moves to block 314, where the $I_{CC}$ setting may be decreased. In one embodiment, the decrease may be accomplished by simply disabling the 100 mA current sink to restore a previous $I_{CC}$ setting of 1400 mA.

If the process proceeds for a further iteration, at block 310, the process 300 once again determines that a $V_{BUS\_LOW}$ signal has not been detected, since the 1460 mA current source may not be subject to a voltage droop when the input line is coupled to current sinks totaling only 1400 mA sinking current. In this circumstance, the process again moves to block 312, where the $I_{CC}$ setting may be increased. The increase in $I_{CC}$ setting may be accomplished by enabling the remaining (50 mA) current sink, which produces a total value of 1450 mA.

At this point, after four iterations, at block 318, in some embodiments the system may determine that no more iterations are to be performed, since each current sink has been coupled to the $V_{BUS}$ INPUT line to test whether a voltage droop ($V_{BUS\_LOW}$ signal) is detected. The system therefore recognizes that the current value (1450 mA) must be within 50 mA of the true capacity of the charging current source, since an $I_{CC}$ setting of 1500 mA produced a $V_{BUS\_LOW}$ signal while an $I_{CC}$ setting of 1400 mA did not produce a $V_{BUS\_LOW}$ signal. If it is deemed acceptable to draw current that may exceed or be less than the charging current source capacity by no more than 50 mA, the process may stop after four iterations.

In other embodiments, an additional iteration may be performed. In the present example, after four iterations, the system only recognizes that an $I_{CC}$ setting of 1500 mA is too high and an $I_{CC}$ setting of 1400 mA does not cause a voltage droop. However, it is not known whether the last setting (1450 mA) exceeds the capacity of the charging current source. If it is deemed desirable for the $I_{CC}$ setting not to exceed the capacity of the charging current source, then additional iteration(s) may be performed. Following the present example, if a further iteration is performed to test the 1450 mA setting, at 310 the system may detect that no $V_{BUS\_LOW}$ signal is produced and thereby recognize that the true current capacity must exceed 1450 mA and be less than 1500 mA. Therefore, instead of increasing the $I_{CC}$ setting the system may terminate the search.

If at block 318 it is determined that a final iteration has been performed, the process moves to block 320. At block 320, an "ALGORITHM DONE" bit is set to indicate that a final determination of an $I_{CC}$ setting has been made.

At block 320, the results of the iterative blocks 310-318 are then stored as an $I_{AVAILABLE}$ setting in a register.

At block 322 the $V_{BUS}$ comparator is disabled and the system may be reconnected to the current charging source at block 324.

The stored $I_{AVAILABLE}$ value may be used by a hardware state machine to set the current limit value to be applied to a battery charger of the PMIC in order for the charger to perform properly when coupled to the charging current source. In the above example, when the system is reconnected to the $V_{BUS}$ signal from the 1460 mA current charging source, the battery charger may limit current to 1450 mA. Thus, no voltage droop should be expected since the PMIC should not draw current in excess of the capability of the current charging source. Moreover, battery charging can be performed in an efficient manner, since the charging current output by the battery charger (1450 mA) is very close to the maximum available current from the external charging current source.

In some embodiments, the $I_{AVAILABLE}$ value determined by process 300 may be stored as a series of bits in a register, in which each bit corresponds to the current value of a set of current sinks described above with respect to FIG. 2. Thus, a five sink arrangement may be used to produce a five bit value stored in the register. In the above example, if current sink enablement is represented by 1, then the five bit value for 1450 mA is 11101, corresponding to 800 mA sink_enabled, 400 mA sink_enabled, 200 mA sink_enabled; 100 mA sink_disabled, and 50 mA sink_enabled. Thus, to determine a five bit value, a total of four or more iterations may be performed in various embodiments of the hardware state machine binary search process.

In some embodiments, the number and the current value of current sinks may be greater or less than the aforementioned examples. For instance, a six sink arrangement may be coupled to a hardware state machine that is arranged to execute a five iteration binary search process to set $I_{AVAILABLE}$.

In other embodiments, a single variable current source may be employed to sink multiple different current levels. The variable current source may be arranged to continuously vary the amount of sinking current. In embodiments of system 10, instead of using a hardware state machine 126, an analog circuit may be arranged to control a variable current source and determine the value of sinking current corresponding to $I_{AVAILABLE}$.

Figure 4:
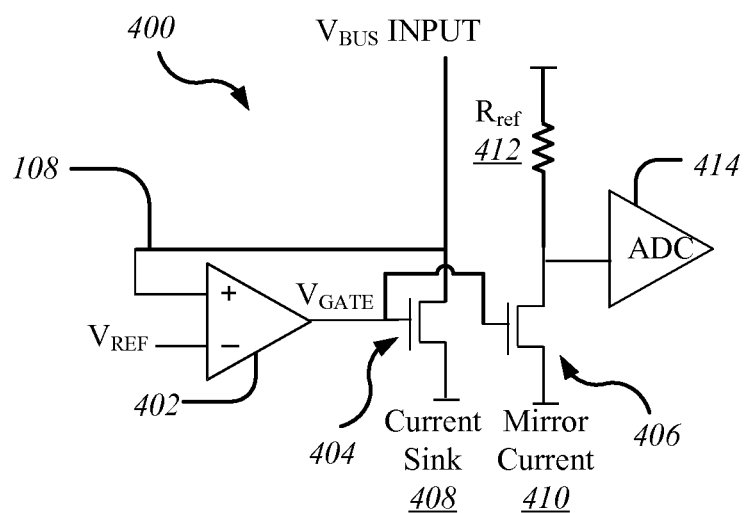
FIG. 4 depicts an embodiment of a charger current estimation device.

FIG. 4 depicts an embodiment of a charger current estimation device 400, in which a variable current source is controlled by a feedback amplifier arrangement in order to estimate charger current capability. In this arrangement, a variable current sink 408 is provided to sink current from the $V_{BUS}$ INPUT signal line 108. A feedback amplifier 402 has as inputs the $V_{BUS}$ INPUT signal and reference $V_{REF}$ signals, and is arranged to output a signal $V_{GATE}$ to control operation of transistors 404 and 406. The transistors 404 and 406 are coupled to a respective current sink 408 and mirror current source 410, which may be coupled to a reference resistance 412.

Feedback amplifier 402 may be arranged to output a voltage $V_{GATE}$ that causes its inputs $V_{BUS}$ INPUT and $V_{REF}$ to equalize. In some embodiments, the reference voltage may be set at a minimum useful voltage, such as 4.2 V. When device 400 is coupled to a charging current source, the voltage $V_{BUS}$ INPUT is fed to amplifier 402, which outputs a voltage $V_{GATE}$ that drives transistor gates 404 and 406. The $V_{BUS}$ INPUT voltage may initially be higher than $V_{REF}$ which may trigger $V_{GATE}$ to increase to allow current from the charging source to pass through transistor 404 to current sink 408. Once $V_{GATE}$ reaches a level to drive transistor 404 to draw sufficient current to the current sink 408, the current capacity of the charging source may be exceeded. At this point, the voltage $V_{BUS}$ INPUT may droop to the level where it matches $V_{REF}$. The amplifier 402 then maintains the present level of $V_{GATE}$, which may generate a comparable sinking current in minor current source 410. By use of reference resistance $R_{REF}$ a signal representing the level of sinking current that induces the voltage droop can be output to analog to digital converter 414. This value of sinking current may be stored and used as a current limit for battery charger 106, when the battery charger is coupled to the charging current source of interest.

Figure 5:
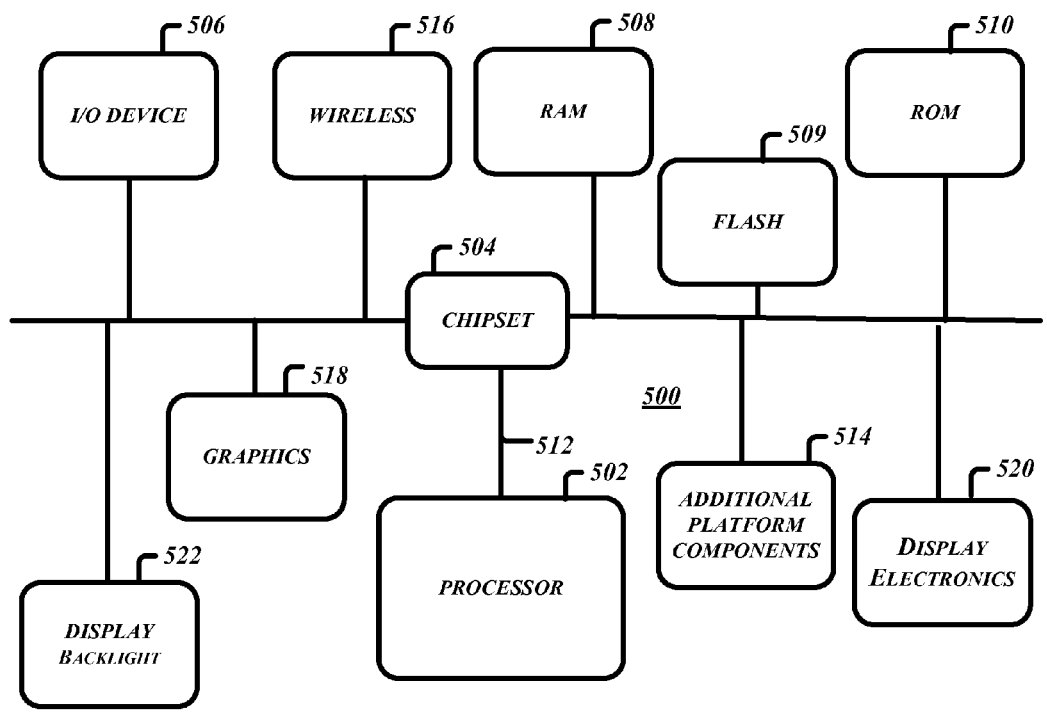
FIG. 5 illustrates one embodiment of a device platform.

FIG. 5 is a diagram of a system embodiment, which may be an embodiment of device platform 114. In particular, FIG. 5 is a diagram showing a platform 500, which may include various elements. For instance, FIG. 5 shows that platform (system) 500 may include a processor 502, a chipset 504, an input/output (I/O) device 506, a random access memory (RAM) (such as dynamic RAM (DRAM)) 508, flash memory 509, and a read only memory (ROM) 510, display electronics 520, display backlight 522, and various other platform components 514. System 500 may also include wireless communications chip 516 and graphics device 518. The embodiments, however, are not limited to these elements.

As shown in FIG. 5, I/O device 506, RAM 508, and ROM 510 are coupled to processor 502 by way of chipset 504. Chipset 504 may be coupled to processor 502 by a bus 512. Accordingly, bus 512 may include multiple lines.

Processor 502 may be a central processing unit comprising one or more processor cores and may include any number of processors having any number of processor cores. The processor 502 may include any type of processing unit, such as, for example, CPU, multi-processing unit, a reduced instruction set computer (RISC), a processor that has a pipeline, a complex instruction set computer (CISC), digital signal processor (DSP), and so forth.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   first circuitry arranged to draw current from a charging source at multiple current levels using one or more current sinks coupled to an input line arranged to couple to the charging source and a voltage comparator having a first input coupled to the input line and a second input arranged to receive a reference voltage; and
   second circuitry arranged to determine a charging current capacity of the charging source using the first circuitry by detecting a voltage drop of the current signal on the input line and determining a charging current capacity value of the charging source based upon a value of total sinking current drawn by the charging source when the voltage drop is detected.

2. The apparatus of claim 1, the voltage comparator arranged to detect a voltage droop in the input line when current drawn by the one or more current sinks exceeds the charging current capacity.

3. The apparatus of claim 1, the first circuitry coupled to the charging source through a USB connection.

4. The apparatus of claim 1, the second circuitry comprising a hardware state machine arranged to:
  apply a search routine that couples one or more of the current sinks to the charging source;
  determine the charging current capacity of the charging source based upon the search routine; and
  store the determined charging current capacity.

5. The apparatus of claim 1, comprising circuitry arranged to:
  detect the presence of a $V_{BUS}$ signal from a USB connector coupled to the charging source; and
  couple the $V_{BUS}$ signal to the first circuitry.

6. The apparatus of claim 1, comprising a battery charger coupled to the second circuitry, the battery charger comprising a current limiting transistor operable to adjust the charging current within the battery charger according to the determined charging current capacity of the charging source.

7. The apparatus of claim 1, comprising a low dropout regulator arranged to receive power from the charging source and to supply power to the first and second circuitry.

8. A method, comprising:
  connecting an input line to one or more current sources arranged to draw a respective one or more sinking currents;
  drawing multiple current levels of a current signal received from a charging source;
  determining a current level at which voltage of the current signal droop;
  detecting a voltage drop of the current signal on the input line when the one or more current sources are connected to the input line; and
  determining a charging current capacity value of the charging source based upon a value of total sinking current drawn by the one or more current sources when the voltage drop is detected.

9. The method of claim 8, the determining the current level comprising performing a binary search routine that opens or closes the current signal to one or more current sinks of a multiplicity of current sinks arranged to couple to the charging source.

10. The method of claim 9, comprising controlling a transistor to open or close the one or more current sinks.

11. The method of claim 9, comprising storing a current capacity value based on a current level at which voltage of the current signal drops.

12. The method of claim 11, comprising limiting current output of a current regulator coupled to a value that corresponds to the current level at which the voltage of the current signal droops.

13. The method of claim 9, comprising:
  performing a binary search that comprises:
  monitoring voltage of the current signal when a level of sinking current is sunk from the charging source;
  increasing the level of sinking current if no voltage drop is observed; and
  decreasing the level of sinking current if a voltage drop is observed.

14. The method of claim 13, comprising
  coupling one or more current sinks to the charging source to adjust the level of sinking current; and
  storing a current capacity value as a bit sequence in which each bit corresponds to a separate current sink and indicates whether that current sink is coupled or decoupled from the charging source when the voltage of the current signal droops.

15. A system, comprising:
  a portable device comprising a set of platform components;
  a battery arranged to provide power to the set of platform components;
  an input line arranged to couple to a charging source;
  one or more current sinks coupled to the input line;
  a voltage comparator having a first input connected to the input line and a second input arranged to receive a reference voltage;
  first circuitry arranged to draw current from the charging source at multiple current levels using one or more current sinks coupled to an input line arranged to couple to the charging source and a voltage comparator having a first input coupled to the input line and a second input arranged to receive a reference voltage;
  second circuitry arranged to determine a charging current capacity of the charging source using the first circuitry by detecting a voltage drop of the current signal on the input line and determining a charging current capacity value of the charging source based upon a value of total sinking current drawn by the charging source when the voltage drop is detected.

16. The system of claim 15, the system coupled to the charging source through a USB connection.

17. The system of claim 15, the voltage comparator arranged to detect a voltage droop in the input line when current drawn by one or more sinks of the multiplicity of current sinks exceeds the charging current capacity.

* * * * *